United States Patent
Benitah

(10) Patent No.: US 8,991,242 B2
(45) Date of Patent: Mar. 31, 2015

(54) DEVICE AND METHOD FOR DETECTING A FAULT IN A LOW-PRESSURE FUEL PUMP OF A TURBOJET AND TURBOJET INCLUDING ONE SUCH DEVICE

(75) Inventor: Jonathan Benitah, Vincennes (FR)

(73) Assignee: SNECMA, Paris (FR)

( * ) Notice: Subject to any disclaimer, the term of this patent is extended or adjusted under 35 U.S.C. 154(b) by 638 days.

(21) Appl. No.: 13/376,275

(22) PCT Filed: Jun. 4, 2010

(86) PCT No.: PCT/EP2010/057857
§ 371 (c)(1),
(2), (4) Date: Dec. 5, 2011

(87) PCT Pub. No.: WO2010/139798
PCT Pub. Date: Dec. 9, 2010

(65) Prior Publication Data
US 2012/0079832 A1    Apr. 5, 2012

(30) Foreign Application Priority Data

Jun. 5, 2009 (FR) ...................................... 09 53736

(51) Int. Cl.
| | | |
|---|---|---|
| F02G 3/00 | (2006.01) | |
| F02C 6/00 | (2006.01) | |
| F02C 7/00 | (2006.01) | |
| G01M 15/00 | (2006.01) | |
| F02C 7/236 | (2006.01) | |
| F01D 21/00 | (2006.01) | |
| F02C 7/32 | (2006.01) | |
| F02C 9/46 | (2006.01) | |

(52) U.S. Cl.
CPC .............. *F02C 7/236* (2013.01); *F01D 21/003* (2013.01); *F02C 7/32* (2013.01); *F02C 9/46* (2013.01); *F05D 2260/80* (2013.01)

USPC ......... 73/114.41; 60/802; 60/803; 60/39.091; 60/779

(58) Field of Classification Search
USPC ............ 60/802, 803, 39.091, 779; 73/114.41, 73/114.38
See application file for complete search history.

(56) References Cited

U.S. PATENT DOCUMENTS

| 2,985,010 | A  * | 5/1961  | Piltz ................................ 73/660 |
| 6,019,310 | A    | 2/2000  | Maino et al. |
| 8,240,120 | B2 * | 8/2012  | Southwick et al. ........ 60/39.091 |
| 2004/0060347 | A1 | 4/2004 | Comperat et al. |
| 2005/0198967 | A1 * | 9/2005 | Subramanian .................. 60/803 |
| 2010/0257867 | A1 | 10/2010 | Aurousseau et al. |

FOREIGN PATENT DOCUMENTS

| EP | 0 889 315 | 1/1999 |
| EP | 1 367 226 | 12/2003 |
| FR | 2 923 871 | 5/2009 |

OTHER PUBLICATIONS

International Search Report Issued Oct. 27, 2010 in PCT/EP10/057857 Filed Jun. 4, 2010.

* cited by examiner

*Primary Examiner* — Gerald L Sung
(74) *Attorney, Agent, or Firm* — Oblon, McClelland, Maier & Neustadt, L.L.P.

(57) ABSTRACT

A device for detecting a fault in a low-pressure fuel pump of a turbojet. The pump is driven by an accessory gearbox including a gear for mechanically driving the accessories. The device measures the vibration frequencies of the accessory gearbox and detects, from among the frequencies, at least one vibration frequency of the low-pressure fuel pump. The device allows a fault in the low-pressure fuel pump to be detected as soon as it occurs.

9 Claims, 2 Drawing Sheets

DEVICE AND METHOD FOR DETECTING A FAULT IN A LOW-PRESSURE FUEL PUMP OF A TURBOJET AND TURBOJET INCLUDING ONE SUCH DEVICE

BACKGROUND OF THE INVENTION

1. Field of the Invention

The invention relates to a device and a method for detecting a failure of a low-pressure fuel pump of a jet engine.

2. Description of the Related Art

A jet engine generally comprises a fan, one or more compressor stages, for example a low-pressure compressor and a high-pressure compressor, a combustion chamber, one or more turbine stages, for example a high-pressure turbine and a low-pressure turbine, and an exhaust duct. In the combustion chamber, compressed fuel is injected and burned with the compressed air from the compressors. Each compressor is joined in rotation to a turbine to which it is linked by a shaft, thus forming a high-pressure body and a low-pressure body.

The combustion chamber is fed with fuel by a fuel circuit in which the fuel is driven by fuel pumps, generally a low-pressure pump and a high-pressure pump.

The concepts of low and high pressure for the fuel pumps are totally decorrelated from the concepts of low and high pressure for the bodies of the jet engine, concerning the pressure of different fluids; by convention, and to simplify the description, the acronyms "HP" and "BP" will be used hereinafter in the description to mean "high pressure" and "low pressure" respectively, both for the bodies of the jet engine or their elements and for the fuel pumps.

The HP pump is placed downstream of the BP pump in the fuel circuit. The HP pump thus receives, from the BP pump, fuel compressed a first time and thus having a sufficient pressure to be, after compression by the HP pump, at a sufficient pressure for its combustion with the compressed air; thus, the function of the BP pump is to feed the HP pump with fuel having undergone a first compression.

The BP and HP pumps are conventionally mechanical pumps which can, for example, be "geared" or impelled. A geared pump notably comprises a driving pinion (or wheel) (mounted to rotate on a shaft driven in rotation by a gear system) and a driven pinion (or wheel), the fuel being compressed in a volume between the teeth of the driving and driven pinions. An impelled pump comprises a wheel (or impeller) provided with blades for compressing the fuel and mounted to rotate on a shaft driven in rotation by a gear system, the fuel being compressed by the centrifugal effect during the rotation of the wheel. Conventionally, the BP pump is an impelled pump and the HP pump is a geared pump.

The driving gear systems of the BP and HP pumps are generally driven indirectly by the shaft of the HP body of the jet engine via a power take-off shaft connected to an accessory relay box which links the power take-off shaft to the pumps by a gear system. The accessory relay box is well known to those skilled in the art by the name "Accessory Gear Box" (AGB). It is a box containing a gear system (that is to say, a mechanism comprising toothed wheels or pinions which mesh to transmit a rotational movement of a shaft to one or more other shafts); this gear system is linked to a certain number of equipment items or accessories, such as, for example, an electricity generator, a starter, an alternator, hydraulic pumps, etc., and, as has just been seen, the BP and HP pumps; the gear system transmits to the accessories the movements taken from the shaft of the HP body of the jet engine, in order to drive them.

A failure of the BP pump (for example due to the ingestion of a foreign body becoming blocked between the blades of the wheel of the BP pump and the casing jacketing them) is usually reflected in the breaking of a fusible portion of the shaft driving the wheel of the BP pump, the fuel then passing directly through the wheel without being compressed (the wheel of the BP pump in effect being a free wheel); this is called the "main failure mode" of the pump. In this case, the HP pump is fed with uncompressed fuel and therefore fuel at a pressure lower than the pressure that it would have had in normal operation, which may result in a "cavitation" of the HP pump, namely the suction by the latter of air mixed with fuel; such a cavitation of the HP pump is extremely damaging to its operation and can cause it great mechanical damage even as far as a rupturing of the gear systems driving it in rotation. In the case of rupture, the fuel no longer being driven in the fuel circuit, the combustion chamber is no longer fed with fuel and the engine stops, with all the potential disastrous consequences of such a stoppage of a jet engine in full flight of the aeroplane that it is propelling.

A failure of the BP pump is not detected as such; it is its consequences that are detected, namely the stopping of the jet engine. There is therefore a real danger in the fact that a failure of the BP pump cannot be detected earlier because, the HP pump continuing to be fed, there is a high risk of the abnormal operation continuing until there is a deterioration of the HP pump and stoppage of the jet engine.

BRIEF SUMMARY OF THE INVENTION

The invention aims to propose a detection device and method that make it possible to effectively and simply identify a failure of the BP pump to anticipate a risk of significant deterioration to the HP pump.

Thus, the invention relates to a device for detecting a failure of a low-pressure fuel pump of a jet engine comprising at least one rotary shaft that can rotate at different speeds, said pump being driven by the rotary shaft via an accessory relay box comprising a gear system for mechanically driving said accessories, the device being characterized in that it includes means for measuring the speed of rotation of the rotary shaft of the jet engine, means for measuring vibration frequencies of the accessory relay box and means for detecting, out of said frequencies, at least one normal vibration frequency of the low-pressure fuel pump at the measured rotation speed of the rotary shaft.

By virtue of the invention, it is possible to detect, very simply, a possible failure of the pump; in fact, it is sufficient to detect the presence or absence of a frequency contribution of the pump in the vibration frequencies of the accessory relay box to deduce therefrom whether the pump is operating normally or not. The detection of a possible failure can therefore be made very quickly, as soon as it occurs; it is thus possible to quickly take any appropriate measure from the start of the malfunction of the BP pump. It is possible in particular to detect the main vibration frequency of the pump and/or its harmonics.

According to a preferred embodiment, the jet engine being a so-called dual-body jet engine comprising a low-pressure body and a high-pressure body, said rotary shaft is the shaft of the high-pressure body of the jet engine.

Preferably, the means for measuring vibration frequencies of the accessory relay box comprise an accelerometer delivering a signal representative of the vibrations of the accessory relay box. Advantageously, it is possible to use the accelerometer which is, conventionally in a jet engine, mounted on the accessory relay box to monitor the behaviour of the bearings of the gear system of this box as well as various other parameters; in this case, a detection is made as to whether at least one vibration frequency of the pump is present or not in the signal supplied by the accelerometer.

Preferably, the accessory relay box and its accessories are arranged so that the vibration frequencies of the different accessories are all different from the vibration frequency of the pump.

The invention also relates to a jet engine comprising at least one rotary shaft that can rotate at different speeds, a fuel circuit with a low-pressure fuel pump and a high-pressure fuel pump driven by the rotary shaft via an accessory relay box comprising a gear system for mechanically driving said accessories, and a device for detecting a failure of the low-pressure fuel pump such as the one described hereinabove.

The jet engine of the invention offers the same advantages as the device described hereinabove.

The invention also relates to a method for detecting a failure of a low-pressure fuel pump of a jet engine comprising at least one rotary shaft that can rotate at different speeds, said pump being driven by the rotary shaft via an accessory relay box comprising a gear system for mechanically driving said accessories, the method being characterized in that:

the rotation speed of the rotary shaft of the jet engine is measured, the vibration frequencies of the accessory relay box are measured and out of said frequencies, at least one normal vibration frequency of the pump at the measured rotation speed of the rotary shaft is detected.

The method of the invention presents the same advantages as the device described hereinabove. It will be understood from the last step of the method that the aim is to detect such a normal vibration frequency; the result of this detection may be positive or negative, indicating whether the BP pump is operating normally or not.

According to a preferred embodiment, the vibration frequencies of the accessory relay box are measured with an accelerometer delivering a signal representative of the vibrations of the accessory relay box.

According to a preferred embodiment:

the signal from the accelerometer is converted into a signal dependent on the phase of the rotation of the low-pressure fuel pump, the average of this converted signal is calculated over a plurality of periods of the low-pressure fuel pump, reduced to a period of amplitude $2\pi$, the power spectral density of this signal is calculated according to the orders of vibration corresponding to multiples of the rotation frequency of the low-pressure fuel pump, determination is made as to whether, at an order corresponding to the vibration frequency of the low-pressure fuel pump, the spectral density exhibits a ray characteristic of the presence of a contribution of the low-pressure fuel pump to this frequency and a conclusion is drawn therefrom as to whether the low-pressure fuel pump is operating normally or not.

According to a preferred embodiment, the pump comprises a wheel driven in rotation at a certain rotation frequency by the gear system of the accessory relay box and a main vibration frequency of the BP pump is a multiple of the rotation frequency of the wheel.

BRIEF DESCRIPTION OF THE SEVERAL VIEWS OF THE DRAWINGS

The invention will be better understood from the following description of the preferred embodiment of the detection device and method of the invention, with reference to the plates of the appended drawings, in which.

DETAILED DESCRIPTION OF THE INVENTION

Figure 1:
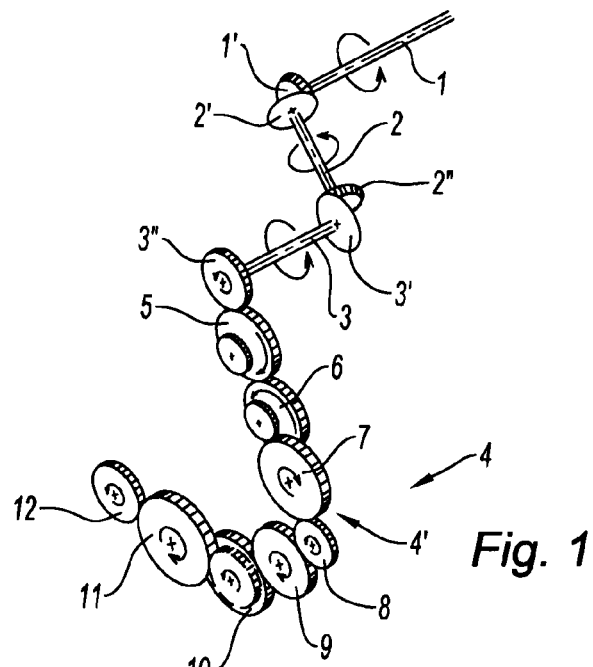
FIG. 1 is a schematic diagram of the gear system of the accessory relay box of the jet engine of the invention.

As is well known to those skilled in the art, a jet engine according to the invention comprises a fan, by which the outside air is sucked into the jet engine, a BP compressor upstream of an HP compressor, arranged to compress the air and at the output of which the compressed air is guided towards a combustion chamber where it is burnt with the fuel which is also compressed; the burnt gases are guided towards an HP turbine and then a BP turbine at the output of which they leave the jet engine through an exhaust duct. The BP compressor is linked to the BP turbine by a rotary shaft, thus forming a BP body, while the HP compressor is linked to the HP turbine by a rotary shaft, thus forming an HP body. The shaft of the HP body is represented schematically in FIG. 1 by the shaft designated by the reference 1.

Conventionally, and as is well known to those skilled in the art, a so-called power take-off shaft 2 is mounted radially in the jet engine and comprises a first tapered pinion 2' which meshes with a tapered pinion 1' of the shaft 1 of the HP body, the power take-off shaft 2 thus being driven in rotation on its axis by the shaft 1 of the HP body. The power take-off shaft 2 comprises, at its opposite end, a second tapered pinion 2" which meshes with a first pinion 3' of an input shaft 3 in an accessory relay box 4, this input shaft 3 extending perpendicularly to the power take-off shaft 2 and therefore parallel to the shaft 1 of the HP body. Those skilled in the art usually refer to such an accessory relay box 4 by its acronym AGB, which stands for "Accessory Gear Box"; it will be designated thus hereinafter in the description; the AGB 4 is a device well known in the field of jet engines.

The AGB 4 rotationally drives various accessories involved in the operation of the jet engine, by virtue of a gear system 4' comprising and driven by a second pinion 3" of its input shaft 3 (and therefore driven indirectly by the shaft 1 of the HP body via the power take-off shaft 2). FIG. 1 schematically shows only the gear system 4' of the AGB 4 and not the AGB 4 as a whole, the AGB 4 also comprising notably a box housing the gear system 4' and various structural members, not represented. The accessories driven by the AGB 4 are, for the most part, generally fixed directly to the box of the AGB 4.

More specifically, the gear system 4' comprises a plurality of pinions 3", 5, 6, 7, 9, 11, 12 driving accessories, these driving pinions 3", 5, 6, 7, 9, 11, 12 being mounted in series with one another and with two additional pinions 8, 10 linking and adapting the rotation speeds of the different pinions 5-14. The second pinion 3" of the input shaft 3 of the AGB 4 is joined in rotation to a shaft rotationally driving an alternator with permanent magnets of a regulator of the jet engine usually designated by its acronym FADEC (Full Authority Digital Engine Control); the other drive pinions 5, 6, 7, 9, 11, 12 are respectively joined in rotation to the input shafts of a manual drive device of the AGB 4, of a turbine starter, of a BP fuel pump 13 and of an HP fuel pump 14, of a generator designated by its acronym IDG (Integrated Drive Generator), of a hydraulic pump and of a lubrication module which are, with the FADEC, the accessories driven by the AGB 4.

Figure 2:
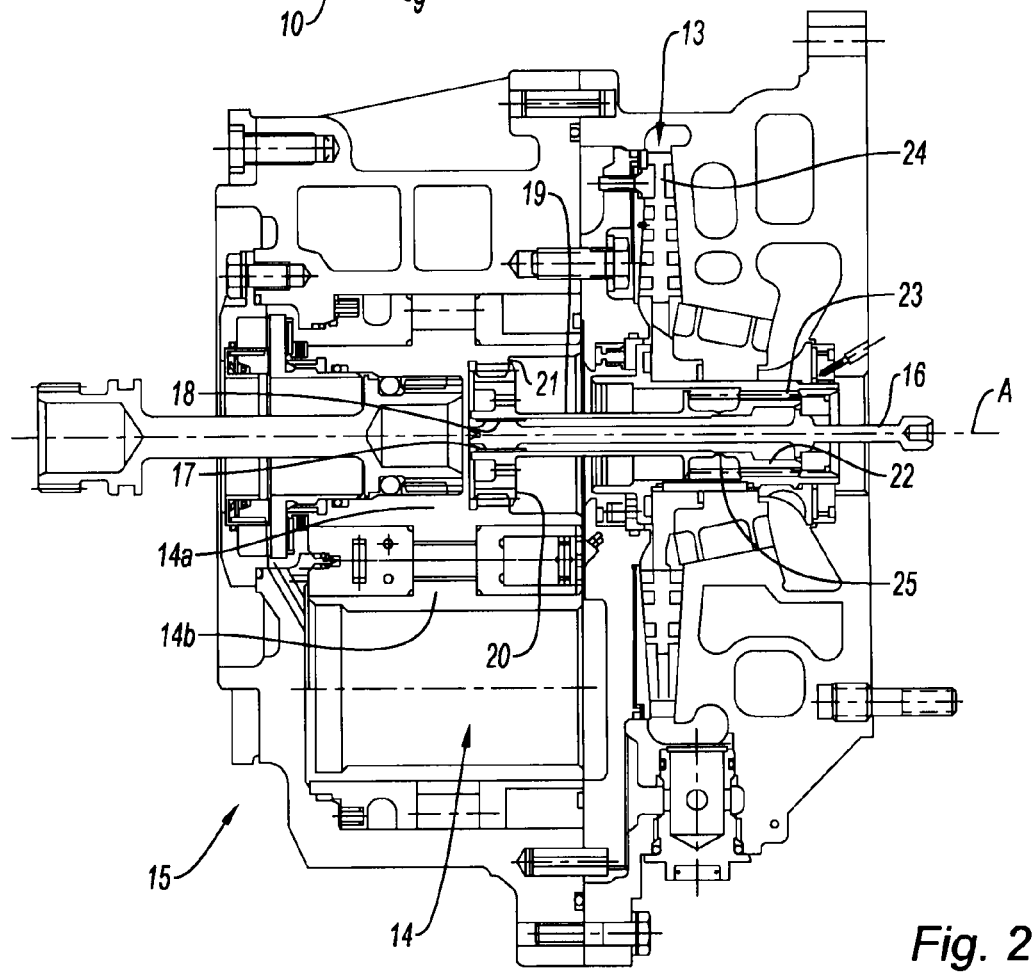
FIG. 2 is a cross-sectional view of a box including BP and HP pumps mounted on the accessory relay box of FIG. 1.

Referring to FIG. 2, the BP fuel pump 13 and the HP fuel pump 14 are the pumps of the fuel circuit of the jet engine; they drive the fuel in this circuit to feed the combustion chamber with fuel. The BP 13 and HP 14 fuel pumps are contained in a common box 15. An input shaft 16 in the box 15, of axis A and joined in rotation to the pinion 7 driving the pumps 13, 14 of the gear system 4' of the AGB 4, drives the BP 13 and HP 14 pumps by this gear system 4'. This shaft 16 comprises, at its end opposite to its end driven by the gear system 4', a coupling portion 17 with peripheral longitudinal splines, arranged to cooperate with a complementary splined coupling portion 18 of an end of a tubular shaft 19 driving the pumps 13, 14, this tubular shaft 19 extending around the input shaft 16, coaxially thereto. The coupling portions 17, 18 each comprising longitudinal splines uniformly distributed angularly around the axis A of the shafts 16, 19, these splines being parallel to one another and to the axis A; the splines of the input shaft 16 are formed on its outer surface and the splines of the tubular shaft 19 are formed on its inner surface. The coupling portions 17, 18 thus provide a rotational coupling of the two shafts 16, 19 about their common axis A.

The tubular shaft 19 comprises, at its end with the internal splines of its coupling portion 18, external splines 20 driving the HP pump 14, arranged to mesh with splines 21 of the mechanism of the HP pump 14, in a way that is conventional in the field of mechanical pumps. There is no need to detail here the structure and the operation of the elements of the HP pump 14, which are well known to those skilled in the art. The HP pump 14 can also conform to any one of the existing HP pump models. In the case in point, the HP pump 14 is a so-called "geared" pump which includes a driving pinion (or wheel) 14a, driven by the tubular shaft 19, the driving pinion 14a driving a driven pinion (or wheel) 14b; the fuel is compressed in a volume between the meshed teeth of the driving 14a and driven 14b pinions, in a manner well known to those skilled in the art.

The tubular shaft 19 comprises, at its opposite end, external splines 22 driving the BP pump 13, arranged to mesh with splines 23 of the drive mechanism of the BP pump 13, in a manner that is conventional in the field of mechanical pumps. The BP pump 13 is, in the case in point, a so-called "impelled" pump which comprises a wheel (or impeller) 24 driven in rotation by the tubular shaft 19, notably via the splines 22, 23. In operation, fuel is injected from the internal side of the wheel 24, the wheel 24 being provided with a plurality of blades, in this case seven of them, arranged to drive the fuel by centrifugal effect from the internal side of the wheel 24 to its external side and thus compress it; there is no need to describe its structure in more detail because it is well known to those skilled in the art; moreover, any type of BP pump 13 can be used. The fuel is collected from the external side of the wheel 24 and guided towards the HP pump 14 which compresses it again, in a known manner which needs not be detailed here.

The tubular shaft 19 driving the BP 13 and HP 14 pumps also includes a fusible portion 25 situated in proximity to its splines 22 driving the BP pump 13. This fusible portion 25 is arranged to break in case of unbalance or excessive stresses on the BP pump 13. Thus, in the event of a malfunction of the BP pump 13 (for example, because of the ingestion of a foreign body), the fusible portion 25 breaks, which decouples the splines 23 of the mechanism driving the BP pump 13—and therefore its wheel 24—from the driving tubular shaft 19. In this case, the wheel 24 is freewheeling and no longer compresses the fuel sucked in by the BP 13 and HP 14 pumps. The HP pump 14 is then fed with uncompressed fuel and risks "cavitating" (that is to say, sucking in air), which may, if this abnormal operation with cavitation is prolonged, result in significant deterioration of the HP pump 14, possibly resulting in the feeding of compressed fuel to the combustion chamber being stopped and therefore the jet engine stopping in full flight. It is precisely to be warned of a failure of the BP pump as soon as it occurs, in order to be able to anticipate the actions to be taken, that the jet engine includes a device 26 for detecting failure of the BP pump 13.

Figure 3:
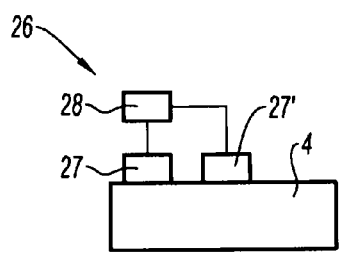
FIG. 3 is a functional block diagram of the AGB and of the device for detecting a failure of the BP pump of the jet engine of FIGS. 1 and 2.

Referring to FIG. 3, this device 26 comprises means 27' for measuring the speed of the jet engine (that is to say, the speed of rotation of the shaft 1 of its HP body), means 27 for measuring vibration frequencies of the AGB 4 and means 28 for detecting, from these frequencies, at least one normal vibration frequency of the BP pump 13 at the measured speed of the jet engine (it will be noted that it is possible to measure the main vibration frequency of the BP pump 13 and/or its harmonics). The vibration frequencies of the AGB 4 comprise the vibration frequencies of the AGB 4 as such but also the vibration frequencies of the accessories that it is driving, since the latter are joined in rotation to the gear system 4' of the AGB 4 which drives in rotation their respective drive shafts.

By virtue of the device 26, it is thus possible to detect the presence or absence, among the vibration frequencies of the AGB 13, of at least one normal vibration frequency of the BP pump 13 at the speed of the jet engine, in the case in point, its main vibration frequency. Thus:

if the vibration frequency of the BP pump 13 is present in the measured vibration frequencies of the AGB 13, it can be deduced therefrom that the BP pump 13 is effectively driven in rotation at its normal operating frequency, that is to say that the fusible means 25 have not broken;

if the vibration frequency of the BP pump 13 is absent from the measured vibration frequencies of the AGB 13, it can be deduced therefrom that the BP pump 13 is no longer driven in rotation at its normal operating frequency, that is to say that the fusible means 25 have broken and that the wheel of the BP pump 13 is not driven in rotation by the AGB 4.

When the failing nature of the operation of the BP pump 13 is known, it is possible to take any appropriate measure in order for the HP pump 14 not to operate (for too long) at cavitation speed, to prevent the HP pump 14 from being damaged and the feeding of compressed fuel to the chamber ending up being stopped; it is therefore possible to take all measures to avoid or at least anticipate stoppage of the jet engine in full flight.

In the case in point, the AGB 4 is designed in such a way that, on the AGB 4, there are no other elements or accessories generating a vibration component of the same frequency as that of the BP pump 13; such a configuration of the AGB 4 is very useful here since it makes it possible to guarantee that the disappearance of the normal vibration frequency of the BP pump 13 in the signal measured by the measurement means 27 is necessarily linked to a malfunction of this BP pump 13. Now, it happens that this type of configuration of the AGB 4 (all the elements vibrating at different frequencies) is widely used in the known jet engines, to avoid any resonance phenomena between the elements driven by the AGB 4; the invention therefore has the merit of using a characteristic that is widely used for other purposes and derives a benefit therefrom.

The vibration frequency generated by the rotation of the BP pump 13 at a given speed of the jet engine can easily be determined from the rotation speed $v_{BP}$ of the wheel 24 of the BP pump 13. This rotation speed $v_{BP}$ is a multiple of the rotation speed $N_{HP}$ of the shaft 1 of the HP body, that is to say that $v_{BP}=k.N_{HP}$, with k being a fixed coefficient (the rotation speed $N_{HP}$ of the shaft 1 of the HP body corresponds, as has been seen, to the speed of the jet engine); the coefficient k is fixed by the kinematic chain which links the shaft 1 of the HP body to the BP pump 13; thus, knowing the gear ratios of all the pairs of pinions meshing with one another from the shaft 1 of the HP body of the jet engine to the BP pump 13, the value of the coefficient k, which has a fixed value independent of the engine speed, is known.

In the case in point, the means 27' for measuring the speed of the jet engine comprise a sensor 27' mounted on the AGB 4 and measuring the rotation speed of the shaft of the AGB 4 rotating at the same speed as the shaft 1 of the HP body of the jet engine, as is known.

In the case in point, the means 27 for measuring the vibration frequencies of the AGB 4 comprise an accelerometer 27. Such an accelerometer 27 is arranged to deliver an electric signal representing the vibrations to which the AGB 4 is subject; the frequency components of this signal correspond to the different vibration frequencies to which the AGB 4 is subject, these vibration frequencies being, for the most part, directly linked to the rotation frequencies of the accessories driven by the AGB 4.

The means 28 for detecting the vibration frequency of the BP pump 13 comprise, in the case in point, a processing unit 28 here comprising a microprocessor, preferably a microprocessor of DSP (Digital Signal Processor) type, optimized for the processing of frequency signals. The means 27' for measuring the speed of the jet engine (sensor 27') and the means 27 for measuring the vibration frequencies of the AGB 4 (accelerometer 27) are linked to the processing unit 28 to deliver it the signal that they measure, these signals being processed by the processing unit 28.

It can be noted here that the presence of an accelerometer on an AGB was known in the prior art, for different purposes. Conventionally, an accelerometer is provided on an AGB to track the behaviour of the bearings of its gear system; to this end, "pointers" are defined, which are indicators calculated on the signal and, based on the trend of these indicators, a determination is made as to whether the bearings are degraded; in particular, the history of the signal that the accelerometer measures, and more specifically the dispersion of its trend, are analyzed. Such a use of an accelerometer is complex whereas the use that is made of the accelerometer 27 for the detection of a failure on the BP pump 13 is simple: either the frequency contribution of the AGB 4 is present, or it is not. Thus, the device and the method for detecting a failure of the BP pump 13 are noteworthy by the simplicity of the analysis involved.

Preferably, the accelerometer 27 used for the detection of failures on the BP pump 13 is the same as the one used to track the behaviour of the bearings of the gear system 4' of the AGB 4. The processing unit 28 used for the detection of failures on the BP pump 13 may also be the same as the one used to track the behaviour of the bearings of the gear system 4', programmed in an ad hoc manner. Devices that are known in a jet engine are thus used to enable them to fulfil a new function.

Figure 4:
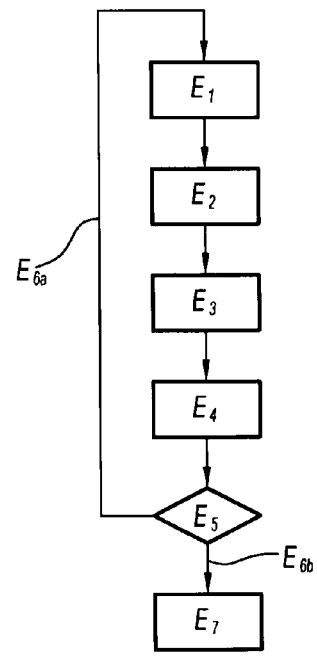
FIG. 4 is a functional block diagram representing certain steps of the preferred embodiment of the method of the invention.

The method for detecting a failure of the BP pump 13 will now be described in more detail, with reference to FIG. 4, according to a possible example of detection of the presence or absence of a contribution of the BP pump 13 to a vibration frequency corresponding to its normal operation at a given speed of the jet engine. Obviously, any other suitable method can be used.

During a first step $E_1$, the jet engine operating at a certain speed $N_{HP}$, this speed $N_{HP}$ is measured using the sensor 27' and the normal vibration frequency of the BP pump 13 is determined at the speed $N_{HP}$ of the jet engine; in other words, the measured speed $N_{HP}$ of rotation of the shaft 1 of the HP body is used to deduce the frequency at which the BP pump 13 should vibrate if it is operating correctly, with a view to verifying, during subsequent steps, whether this normal vibration frequency does indeed figure in the signal measured by the accelerometer 27. As has been seen above, this normal vibration frequency of the BP pump 13 depends on the rotation speed of the wheel 24 of the BP pump 13 which in turn depends directly on the measured speed of the jet engine according to the formula: $v_{BP}=k.N_{HP}$ with k being fixed. Thus, at each measured speed $N_{HP}$ of the jet engine, the rotation speed $v_{BP}$ at which the BP pump 13 should rotate if it is operating normally is known. Depending on the structure of the BP pump 13, it is then possible to determine its main vibration frequency; in the case in point, the wheel 24 of the BP pump 13 comprising seven blades, the main vibration frequency $f_v$ of the BP pump 13 is equal to seven times its rotation frequency (speed) (the frequency of passage of the blades being equal to seven times the rotation frequency of the wheel 24 since there are seven blades), that is to say $f_v=7.v_{HP}=7.k.N_{HP}$.

During a second step $E_2$, the signal from the accelerometer, which is a signal of the type $\gamma=f(t)$ (signal $\gamma$ dependent on the time t), is converted into a signal of type $\gamma=f(\phi)$ dependent on the phase $\phi$ of the rotation of the BP pump 13.

During a third step $E_3$, the average of this converted signal is calculated over a plurality of periods (or revolutions) of the BP pump 13, reduced to a period of amplitude $2\pi$.

On completion of the steps $E_2$ and $E_3$, a signal is obtained that is said to be "resampled" (the first sampling having been performed at the time of the measurement) and averaged.

During a fourth step $E_4$, the power spectral density D of the signal (in $m^2.sec^{-3}$, uniform at an acceleration squared divided by Hertz) is calculated according to the orders of vibration O (the orders of vibration being multiples of the rotation speed $v_{BP}$ of the BP pump 13).

During a fifth step $E_5$, a determination is then made as to whether, at the order corresponding to the main vibration frequency of the BP pump 13, the spectral density exhibits a ray characteristic of the presence of a contribution to this frequency or whether there is no ray. Based on this information, a conclusion is drawn therefrom as to whether the BP pump 13 is operating correctly or not and how to proceed with the detection method is defined. Thus:

if there is a ray, this means that the vibratory signal of the AGB 4 includes a contribution to the vibration frequency of the BP pump 13 in normal operation at the engine speed concerned; the BP pump 13 being the only element of the AGB 4 (or fixed thereto) generating a vibration at this frequency, it can be deduced therefrom with certainty that it is indeed the BP pump 13 which is the origin of this frequency contribution and therefore that it is operating correctly; the method is then implemented again (arrow $E_{6a}$) to ensure a continuous monitoring of the operation of the BP pump 13;

if there is no ray, this means that the BP pump 13 is not generating the vibration that it should be generating, that is to say that it is not rotating at the speed at which it should rotate at the speed concerned of the jet engine and that there is therefore a failure; there is then a transition (arrow E6b) to a decision step E7 in reaction to this malfunction; measures can be taken rapidly since the failure is detected upon its occurrence.

Figure 5A:
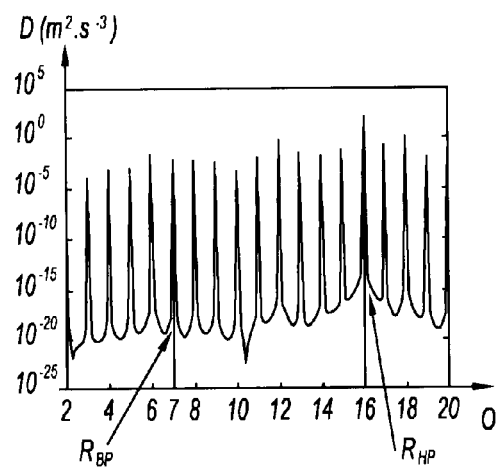
FIGS. 5a and 5b are diagrams representing the power spectral density of the signal supplied by the accelerometer of the accessory relay box of FIGS. 1 to 3 according to the orders of vibration corresponding to the multiples of the rotation speed of the BP pump.
Figure 5B:
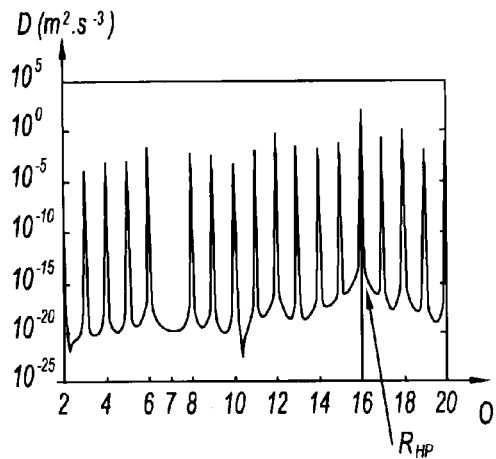

FIGS. 5a and 5b show the power spectral density D of the average signal from the accelerometer 27 according to the orders of vibration O, in the case of normal operation of the BP pump 13 (FIG. 5a) and in a case of malfunction of the BP pump 13 (FIG. 5b).

In the example described, when the BP pump 13 is operating normally, it can be seen in FIG. 5a that the signal from the accelerometer 27 exhibits a ray $R_{BP}$ at order 7, corresponding to the contribution of the BP pump 13 to the signal, and a ray $R_{HP}$ at order 16, corresponding to the contribution of the HP pump 14 to the signal. The orders O corresponding to the rays of the BP 13 and HP 14 pumps according to the structure of the latter and the different gear ratios involved are known; thus, in the case in point, as explained above, the main ray of the BP pump 13 is at order 7 because the wheel 24 of the BP pump 13 has seven blades and the orders are multiples of the rotation speed of the BP pump 13.

When the BP pump 13 is operating abnormally, FIG. 5b shows that the ray $R_{BP}$ has disappeared, only the ray $R_{HP}$p of the HP pump 14 still appearing; the residual amplitude of the power spectral density at the level of the order of vibration 7 corresponds to the noise on the signal.

All the steps described above can be implemented by the processing unit 28. It is obviously possible to refine the analysis by detecting not only the main ray (the main vibration frequency of the BP pump 13) but also its harmonics, which offers a greater robustness of the algorithm to the noise on the signal (the energy (and therefore the portion of the signal) corresponding to the vibrations of the BP pump being low compared to the energy (and therefore the portion of the signal) corresponding to the jet engine itself).

The accelerometer 27 may be uni- or pluridirectional. The acceleration of the AGB 4 is measured a priori in a single direction which is the direction perpendicular to the direction of the shafts of the accessories driven by the AGB 4 (parallel to one another and to the shaft 1 of the HP body of the jet engine); this does not, however, prevent the use of a pluridirectional accelerometer. The bandwidth of the accelerometer 27 is preferably of the order of 20 kHz.

Preferably, to detect the presence or absence of a ray in the power spectral density (which may include more noise than in FIGS. 5a and 5b), it is possible to provide the measurement of signals on standard reference AGBs and the measured signal is compared with the reference signals to deduce therefrom whether the ray that is being sought is present or not.

The invention claimed is:

1. A device for detecting a failure of a low-pressure fuel pump of a jet engine including at least one rotary shaft that can rotate at different speeds, the low-pressure fuel pump being driven by the rotary shaft via an accessory relay box including a gear system for mechanically driving accessories, the device comprising:
a first sensor which measures speed of rotation of the rotary shaft of the jet engine;
a second sensor which measures vibration frequencies of the accessory relay box; and
a processing unit including a processor which detects, from the detected frequencies, at least one normal vibration frequency of the low-pressure fuel pump at the measured rotation speed of the rotary shaft.

2. The device according to claim 1, wherein the jet engine is a dual-body jet engine comprising a low-pressure body and a high-pressure body, and the rotary shaft is the shaft of the high-pressure body of the jet engine.

3. The device according to claim 1, wherein the second sensor comprises an accelerometer delivering a signal representative of the vibrations of the accessory relay box.

4. The device according to claim 1, wherein the accessory relay box and the accessories thereof are arranged so that the vibration frequencies of the accessories are all different from the vibration frequency of the low-pressure fuel pump.

5. A jet engine comprising: at least one rotary shaft that can rotate at different speeds; a fuel circuit with a low-pressure fuel pump and a high-pressure fuel pump driven by the rotary shaft via an accessory relay box comprising a gear system for mechanically driving accessories; and a device for detecting a failure of the low-pressure fuel pump of the jet engine including: a first sensor which measures speed of rotation of the rotary shaft of the jet engine; a second sensor which measures vibration frequencies of the accessory relay box; and a processing unit including a processor which detects, from the detected frequencies, at least one normal vibration frequency of the low-pressure fuel pump at the measured rotation speed of the rotary shaft.

6. A method for detecting a failure of a low-pressure fuel pump of a jet engine including at least one rotary shaft that can rotate at different speeds, the pump being driven by the rotary shaft via an accessory relay box including a gear system for mechanically driving the accessories, the method comprising:
measuring rotation speed of the rotary shaft of the jet engine;
measuring vibration frequencies of the accessory relay box; and
from the measured frequencies, detecting at least one normal vibration frequency of the low-pressure fuel pump at the measured rotation speed of the rotary shaft.

7. The method according to claim 6, wherein the vibration frequencies of the accessory relay box are measured with an accelerometer delivering a signal representative of the vibrations of the accessory relay box.

8. The method according to claim 6, wherein:
a signal from the accelerometer is converted into a signal dependent on the phase of the rotation of the low-pressure fuel pump;
an average of the converted signal is calculated over a plurality of periods of the low-pressure fuel pump, reduced to a period of amplitude $2\pi$;
power spectral density of a signal is calculated according to orders of vibration corresponding to multiples of the rotation frequency of the low-pressure fuel pump; and
a determination is made as to whether, at an order corresponding to the vibration frequency of the low-pressure fuel pump, spectral density exhibits a ray characteristic of presence of a contribution of the low-pressure fuel pump to the frequency and a conclusion is drawn therefrom as to whether the low-pressure fuel pump is operating normally or not.

9. The method according to claim 8, wherein the low-pressure fuel pump comprises a wheel driven in rotation at a certain rotation frequency by the gear system of the accessory relay box and a main vibration frequency of the low-pressure fuel pump is a multiple of the rotation frequency of the wheel.

* * * * *

UNITED STATES PATENT AND TRADEMARK OFFICE
CERTIFICATE OF CORRECTION

PATENT NO. : 8,991,242 B2  
APPLICATION NO. : 13/376275  
DATED : March 31, 2015  
INVENTOR(S) : Jonathan Benitah Page 1 of 1

It is certified that error appears in the above-identified patent and that said Letters Patent is hereby corrected as shown below:

In the specification

Col. 8, line 30, change "$f_v=7.v_{HP}=7.k.N_{HP}$" to --$f_v=7.V_{BP}=7.k.N_{HP}$--.

Signed and Sealed this  
Seventeenth Day of November, 2015

Michelle K. Lee  
*Director of the United States Patent and Trademark Office*